US012182222B2

(12) United States Patent
Komissarov et al.

(10) Patent No.: US 12,182,222 B2
(45) Date of Patent: Dec. 31, 2024

(54) METHOD AND SYSTEM FOR CONTROLLING DISPLAY OF A WEB PAGE

(71) Applicant: YANDEX EUROPE AG, Lucerne (CH)

(72) Inventors: Aleksandr Vladimirovich Komissarov, Novosibirsk (RU); Sergey Vyacheslavovich Baibik, Saint Petersburg (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/134,015

(22) Filed: Apr. 12, 2023

(65) Prior Publication Data

US 2023/0325455 A1 Oct. 12, 2023

(30) Foreign Application Priority Data

Apr. 12, 2022 (RU) .............................. RU2022109773

(51) Int. Cl.
*G06F 17/00* (2019.01)
*G06F 16/957* (2019.01)
(52) U.S. Cl.
CPC ................. *G06F 16/9577* (2019.01)
(58) Field of Classification Search
CPC .. G06F 16/9577; G06F 16/986; G06F 40/103; G06F 40/143; G06F 40/106; H04L 67/02
See application file for complete search history.

(56) References Cited

U.S. PATENT DOCUMENTS

| 7,660,779 B2 | 2/2010 | Goodman et al. |
| 7,716,596 B2 | 5/2010 | Cao et al. |

(Continued)

FOREIGN PATENT DOCUMENTS

| CN | 104715069 A | 6/2015 |
| CN | 109344352 B * | 4/2021 |

(Continued)

OTHER PUBLICATIONS

Goyal, "How to disable browser Autocomplete on web form field/input tag", article published on Nov. 18, 2020, https://www.geeksforgeeks.org/how-to-disable-browser-autocomplete-on-web-form-field-input-tag/.

(Continued)

*Primary Examiner* — Laurie A Ries
(74) *Attorney, Agent, or Firm* — BCF LLP

(57) ABSTRACT

A method and a system for controlling display of a web page in a browser application are provided. The method comprises: receiving data representative of the web page to be displayed in the browser application; identifying, based on the data, in the web page, the at least one user-activatable layout element displayable during the display of the web page; causing a simulated user interaction with the at least one user-activatable layout element; determining if the simulated user interaction causes a layout change indicative of the web page being configured to provide web page customized suggests in the at least one user-activatable layout element; in response to the layout change, disabling the browser application to provide the browser customized suggests in the at least one user-activatable layout element in the web page during the display thereof.

20 Claims, 7 Drawing Sheets

(56) References Cited

U.S. PATENT DOCUMENTS

| | | | |
|---|---|---|---|
| 9,330,200 B2 | 5/2016 | Lal et al. | |
| 10,108,336 B2* | 10/2018 | Bloch | G06F 3/04845 |
| 11,379,092 B2* | 7/2022 | Magureanu | G06F 18/24137 |
| 11,640,492 B2* | 5/2023 | Fialkow | G06F 16/958 |
| | | | 715/235 |
| 11,789,597 B2* | 10/2023 | Gabryjelski | G06F 16/9562 |
| | | | 715/733 |
| 2005/0216856 A1* | 9/2005 | Matti | G06F 16/9577 |
| | | | 715/764 |
| 2008/0109747 A1 | 5/2008 | Cao et al. | |
| 2009/0144124 A1* | 6/2009 | Surendran | G06Q 30/0256 |
| | | | 705/14.54 |
| 2010/0023854 A1* | 1/2010 | Song | G06F 16/972 |
| | | | 715/234 |
| 2013/0205189 A1* | 8/2013 | DiPierro | G06F 3/0483 |
| | | | 715/224 |
| 2013/0226952 A1* | 8/2013 | Lal | G06F 40/143 |
| | | | 707/767 |
| 2014/0181639 A1* | 6/2014 | Lund | G06F 3/04883 |
| | | | 715/234 |
| 2014/0215308 A1* | 7/2014 | Cantrell | G06F 16/9577 |
| | | | 715/234 |
| 2021/0081470 A1* | 3/2021 | Fisher | H04L 67/10 |
| 2023/0315242 A1* | 10/2023 | Rajasankar | G06F 3/04842 |
| | | | 715/234 |

FOREIGN PATENT DOCUMENTS

| | | | | |
|---|---|---|---|---|
| KR | 101002737 B1 | 12/2010 | | |
| RU | 2012117817 A | 11/2013 | | |
| RU | 2746848 C1 | 4/2021 | | |
| WO | WO-2013178805 A2 * | 12/2013 | | G06F 16/957 |
| WO | WO-2016107871 A1 * | 7/2016 | | G06F 17/3089 |
| WO | WO-2017152216 A1 * | 9/2017 | | G06F 17/217 |
| WO | 2020068169 A1 | 4/2020 | | |
| WO | 2020101522 A1 | 5/2020 | | |

OTHER PUBLICATIONS

Mortensen et al. "How do you disable browser autocomplete on web form field / input tags", https://stackoverflow.com/questions/2530/how-do-you-disable-browser-autocomplete-on-web-form-field-input-tags/49810693#49810693.

Russian Search Report dated Dec. 7, 2023 issued in respect of the counterpart Russian Patent Application No. RU 2022109773.

* cited by examiner

METHOD AND SYSTEM FOR CONTROLLING DISPLAY OF A WEB PAGE

CROSS-REFERENCE

The present application claims priority to Russian Patent Application No. 2022109773, entitled "Method and System for Controlling Display of a Web Page", filed Apr. 12, 2022, the entirety of which is incorporated herein by reference.

FIELD

The present technology relates generally to web browsing; and in particular, to a method of and system for controlling display of certain layout elements in a web page.

BACKGROUND

When a user is browsing web pages on a network, such as the Internet, using a browser application (such as a Yandex-.Browser™ browser application, a Google Chrome™ browser application, an Opera™ browser application, and the like), he or she can be provided with suggests in certain layout elements of a given web page. For example, the web page can be configured for receiving user information of the user, and thus can include an input field allowing a text input from the user, such as a delivery address of the user, for which autocompletion within the input field can be offered.

In one example, the suggests can be provided by the browser application. More specifically, the browser application can be configured to (i) store user inputs in various layout elements as the user browses web pages; and (ii) upon identifying the input field in the given web page as one being designated for inputting, for example, an address, banking card information, a name of a product, provide a corresponding input, which the user has made, via the browser application, before. The format of such an input can be an autocompleted text string or in a dropdown menu, as an example.

However, the given web page can also be configured for providing customized suggests in the input field. For example, based on an identified current location of the user, a web server hosting the web page can be configured to autocomplete the address the user is typing in the input field.

Thus, the suggests provided by the browser application and the web page can be conflicting, such as overlie each other in the input field, as the user provides their input therein, which may affect user experience from interacting with the given web page.

Certain prior art approaches have been proposed to tackle the above-identified technical problem.

U.S. Pat. No. 9,330,200-B2, issued on May 3, 2016, assigned to Capital Intellect Inc, and entitled "SYSTEM AND METHOD FOR PRESENTING INPUT SUGGESTIONS IN INPUT FIELDS OF A SPECIFIC TYPE IN WEB PAGES BY REPLACING THE INPUT FIELD WITH A COMBO BOX" discloses systems and methods for displaying input suggestions on web pages having an input field for receiving a specific type of user input. A module stored on a user device is remote from a database containing the input suggestions. The module detects the presence of any input fields of a specific type in a web page. For each detected input field of the specific type, the module generates a combo box that is displayed so as to cover and visually replace the input field. The combo boxes display input suggestions contained in the database. The database can be updated to add or remove input suggestions for particular websites determined to be valid or invalid at those websites. Analysis of the validity of the input suggestions can be based on page analyses sent from the module and performed before and after any submission of an input suggestion.

U.S. Pat. No. 7,716,596-B2, issued on May 11, 2010, assigned to Twitter Inc, and entitled "DYNAMIC INPUT FIELD PROTECTION" discloses a computer implemented method and computer program product for protecting a pre-filled user input field on a returned webpage from an accidental overwrite. The method identifies the pre-filled input field by detecting a mouseover. In response to a user command to change the state of the pre-filled input field, the method changes an initially unlocked pre-filled input field to a locked state or changes an initially locked pre-filled input field to an unlocked state.

SUMMARY

Therefore, there is a need for systems and methods which avoid, reduce or overcome the limitations of the prior art.

Developers of the present technology have appreciated that conflicts between the suggests provided by the browser application and the given web page can be avoided if layout elements thereof, in which the given web page is configured for providing its suggests, are preliminarily identified before the user activates them for inputting any data therein.

More specifically, the developers have devised methods and systems directed to analyzing responses of the layout elements of the given web page to simulated user interactions (such as hit testing, as an example). For example, if a given layout element of the given web page changes its visual appearance in response to a respective user simulated interaction, it may be indicative of the given web page being configured for providing web page customized suggests therein. In this regard, the present methods and systems are directed to disabling the browser application so that to prevent it from providing browser customized suggests in the given layout element.

By doing so, various non-limiting embodiments of the present technology allow prioritizing one suggests over the other, that is, the web page customized suggests over the browser customized suggests, as an example, and the conflicts therebetween, such as overlap thereof, in the given layout element can be prevented, which may positively impact the user experience.

The developers have also appreciated that the present methods and systems of identifying the layout elements used for outputting web page suggests are especially practical in cases where the given web page is developed using one of a JavaScript programming language and a Cascading Style Sheets (CSS) programming language whose source codes may not provide comprehensive data on types of the layout elements to be rendered in the given web page, as opposed to HyperText Markup Language, for example.

More specifically, in accordance with a first broad aspect of the present technology, there is provided a method of controlling display of a web page in a browser application. The method is executable by a processor of an electronic device running the browser application. The browser application is configured to provide browser customized suggests in at least one user-activatable layout element of the web page. The method comprises: receiving, by the processor, data representative of the web page to be displayed in the browser application; identifying, based on the data, in the web page, the at least one user-activatable layout element displayable during the display of the web page; causing, by the processor, a simulated user interaction with the at least one user-activatable layout element; determining, by the processor, if the simulated user interaction causes a layout change indicative of the web page being configured to provide web page customized suggests in the at least one user-activatable layout element, the web page customized suggests having been generated by the web page independent of the browser application; in response to the layout change being indicative of the web page being configured to provide the web page customized suggests in the at least one user-activatable layout element: disabling, by the processor, the browser application to provide the browser customized suggests in the at least one user-activatable layout element in the web page during the display thereof.

In some implementations of the method, the data representative of the web page comprises at least one of a JavaScript source code and a Cascading Style Sheets (CSS) source code thereof.

In some implementations of the method, to the causing the simulated user-interaction, the method further comprises: retrieving, by the processor, a respective scanning pattern for the at least one user-activatable layout element, the respective scanning pattern comprising a plurality of points representative of a visual appearance of the at least one user-activatable layout element within the web page; applying, by the processor, the respective scanning pattern to an area of the at least one user-activatable layout element, and wherein: the causing the simulated user interaction with the at least one user-activatable layout element comprises causing the simulated user interaction with each one of the plurality of points.

In some implementations of the method, the causing the simulated user interaction with a given one of the plurality of points is executed with a predetermined time interval.

In some implementations of the method, in response to the simulated user interaction with the given one of the plurality of points not causing the web page to provide the web page customized suggests in the at least one user-activatable layout element, the method further comprises increasing, by the processor, the predetermined time interval.

In some implementations of the method, the increasing the predetermined time interval at each iteration of causing the simulated user interaction with the given one of the plurality of points is exponential.

In some implementations of the method, the simulated user interaction comprises hit-testing of the at least one user-activatable layout element.

In some implementations of the method, the causing the simulated user interaction is executed prior to the display of the web page.

In some implementations of the method, the causing the simulated user interaction is executed during the display of the web page.

In some implementations of the method, the causing the simulated user interaction is executed in response to refreshing the web page.

In some implementations of the method, in response to the layout change being indicative of the web page being configured to provide the web page customized suggests in the at least one user-activatable layout element, the method further comprises: disabling, by the processor, the web page to provide the web page customized suggests in the at least one user-activatable layout element in the web page during the display thereof.

In accordance with a second broad aspect of the present technology, there is provided a method of controlling display of a web page in a browser application. The method is executable by a processor of an electronic device running the browser application. The browser application is configured to provide browser customized suggests in at least one user-activatable layout element of the web page. The method comprises: receiving, by the processor, data representative of the web page to be displayed in the browser application; identifying, based on the data, in the web page, the at least one user-activatable layout element displayable during the display of the web page; causing, by the processor, a simulated user interaction with the at least one user-activatable layout element; determining, by the processor, if the simulated user interaction causes a layout change to the at least one user-activatable layout element; in response to the simulated user interaction causing the layout change to the at least one user-activatable layout element: disabling, by the processor, browser modifications, generated by the web browser application, to contents of the at least one user-activatable layout element in the web page during the display thereof.

In some implementations of the method, the layout change to the at least one user-activatable layout element is indicative of the web page being configured for providing, in the at least one user-activatable layout elements, web page customized suggests to a user browsing the web page, the web page customized suggests having been generated by a web server hosting the web page.

In some implementations of the method, the browser modifications to the contents of the at least one user-activatable element comprises providing, by the processor, providing, by the browser application, browser customized suggests in the at least one user-activatable layout element, the browser customized suggests having been generated by the browser application.

In accordance with a third broad aspect of the present technology, there is provided a method of controlling display of a web page in a browser application. The method is executable by a processor of an electronic device running the browser application. The browser application is configured to provide browser customized suggests in at least one user-activatable layout element of the web page. The method comprises: receiving, by the processor, data representative of the web page to be displayed in the browser application; identifying, based on the data, in the web page, the at least one user-activatable layout element displayable during the display of the web page; causing, by the processor, a simulated user interaction with the at least one user-activatable layout element; determining, by the processor, if the simulated user interaction causes a layout change indicative of the web page being configured to provide web page customized suggests in the at least one user-activatable layout element, the web page customized suggests having been generated by the web page independent of the browser application; in response to the layout change being indicative of the web page being configured to provide the web page customized suggests in the at least one user-activatable layout element: disabling, by the processor, a pre-determined one of: the browser application to provide the browser customized suggests in the at least one user-activatable layout element in the web page during the display thereof; and the web page to provide the web page customized suggests in the at least one user-activatable layout element in the web page during the display thereof.

In some implementations of the method, the data representative of the web page comprises at least one of a JavaScript source code and a Cascading Style Sheets (CSS) source code thereof.

In some implementations of the method, prior to the causing the simulated user-interaction, the method further comprises: retrieving, by the processor, a respective scanning pattern for the at least one user-activatable layout element, the respective scanning pattern comprising a plurality of points representative of a visual appearance of the at least one user-activatable layout element within the web page;

applying, by the processor, the respective scanning pattern to an area of the at least one user-activatable layout element, and wherein: the causing the simulated user interaction with the at least one user-activatable layout element comprises causing the simulated user interaction with each one of the plurality of points.

In some implementations of the method, the causing the simulated user interaction with a given one of the plurality of points is executed with a predetermined time interval.

In some implementations of the method, in response to the simulated user interaction with the given one of the plurality of points not causing the web page to provide the web page customized suggests in the at least one user-activatable layout element, the method further comprises increasing, by the processor, the predetermined time interval.

In some implementations of the method, the increasing the predetermined time interval at each iteration of causing the simulated user interaction with the given one of the plurality of points is exponential.

In some implementations of the method, the simulated user interaction comprises hit-testing of the at least one user-activatable layout element.

In accordance with a fourth broad aspect of the present technology there is provided a system for controlling display of a web page in a browser application. The system comprises an electronic device running the browser application configured to provide browser customized suggests in at least one user-activatable layout element of the web page. The electronic device comprises: a processor and a non-transitory computer-readable medium storing instructions. The processor, upon executing the instructions, is configured to: receive data representative of the web page to be displayed in the browser application; identify, based on the data, in the web page, the at least one user-activatable layout element displayable during the display of the web page; cause a simulated user interaction with the at least one user-activatable layout element; determine if the simulated user interaction causes a layout change indicative of the web page being configured to provide web page customized suggests in the at least one user-activatable layout element, the web page customized suggests having been generated by the web page independent of the browser application; in response to the layout change being indicative of the web page being configured to provide the web page customized suggests in the at least one user-activatable layout element: disable the browser application to provide the browser customized suggests in the at least one user-activatable layout element in the web page during the display thereof.

In some implementations of the system, prior to causing the simulated user-interaction, the processor is further configured to: retrieve a respective scanning pattern for the at least one user-activatable layout element, the respective scanning pattern comprising a plurality of points representative of a visual appearance of the at least one user-activatable layout element within the web page; apply the respective scanning pattern to an area of the at least one user-activatable layout element, and wherein: to cause the simulated user interaction with the at least one user-activatable layout element, the processor is configured to cause the simulated user interaction with each one of the plurality of points.

In some implementations of the system, the processor is configured to cause the simulated user interaction with a given one of the plurality of points with a predetermined time interval.

In some implementations of the system, in response to the simulated user interaction with the given one of the plurality of points not causing the web page to provide the web page customized suggests in the at least one user-activatable layout element, the processor is further configured to increase the predetermined time interval.

In some implementations of the system, the processor is configured to exponentially increase the predetermined time interval at each iteration of causing the simulated user interaction with the given one of the plurality of points.

In some implementations of the system, the simulated user interaction comprises hit-testing of the at least one user-activatable layout element.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 3 depicts a schematic diagram of a graphical user interface (GUI) of a browser application run on an electronic device present in the networked computing environment of FIG. 2 and providing a visual representation of a given web page, in accordance with certain non-limiting embodiments of the present technology;

DETAILED DESCRIPTION

Figure 1:
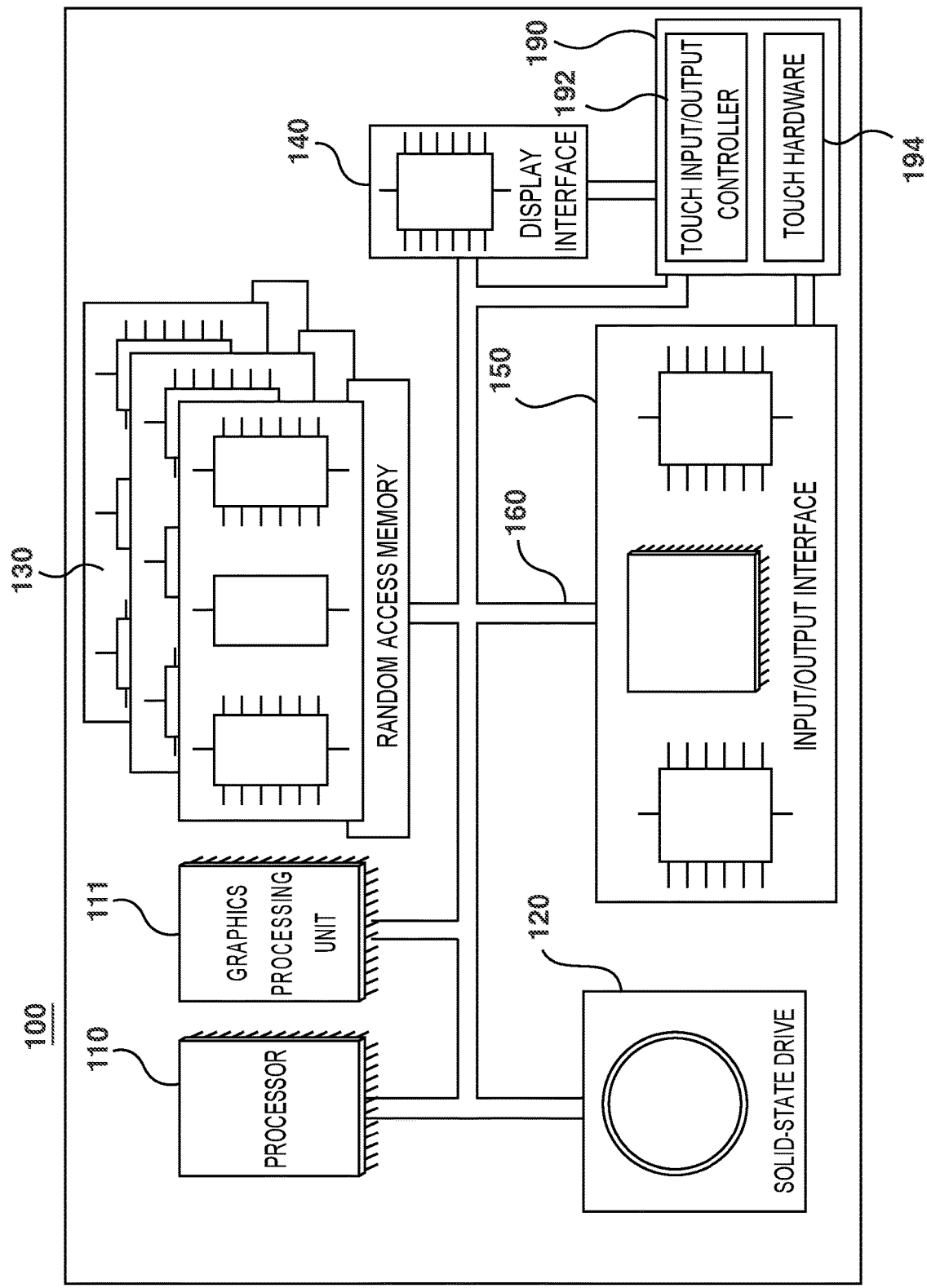
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description.

Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen—such as a screen (not separately labelled) of an electronic device 210 depicted in FIG. 2. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
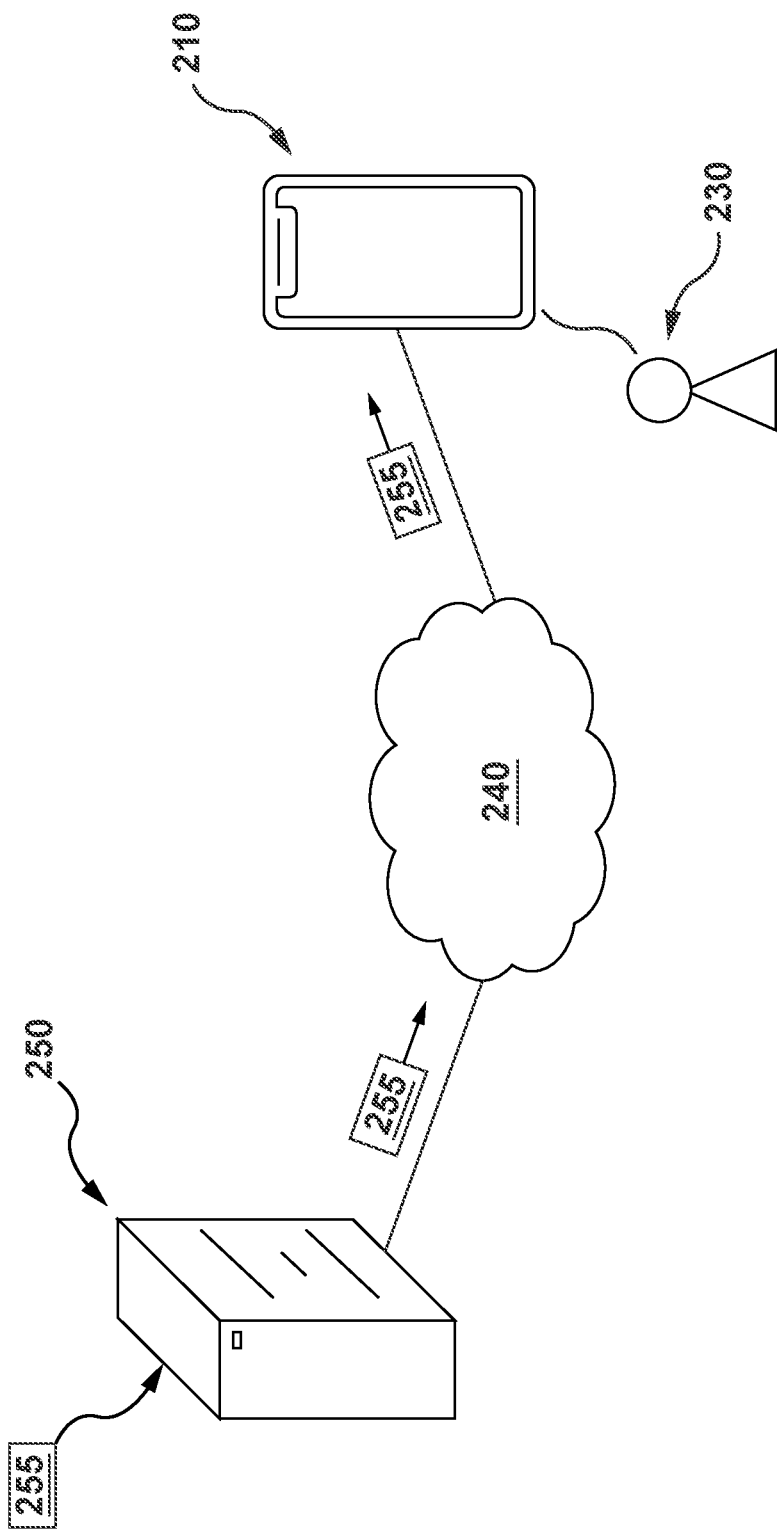
FIG. 2 depicts a schematic diagram of a networked computing environment comprising the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 communicatively coupled, via a communication network 240, with a server 250. In some non-limiting embodiments of the present technology, the electronic device 210 may be associated with a user 230.

In the non-limiting embodiments of the present technology, the electronic device 210 may be any computer hardware that is capable of running a software appropriate to the relevant task at hand. Thus, some non-limiting examples of the electronic device 210 may include personal computers (desktops, laptops, netbooks, etc.), smartphones, and tablets. Thus, the electronic device 210 may comprise some or all components of the computer system 100 depicted in FIG. 1.

In some non-limiting embodiments of the present technology, the server 250 can be implemented as a conventional computer server and may comprise some or all of the components of the computer system 100 of FIG. 1. In one non-limiting example, the server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 250 is a single server. In alternative non-limiting embodiments of the present technology (not depicted), the functionality of the server 250 may be distributed and may be implemented via multiple servers.

According to some non-limiting embodiments of the present technology, the server 250 can be configured to host a given web resource 255. Broadly speaking, the given web resource 255 may contain and thus provide access to information of various types, such as texts, images, audio, and video organized in at least one web page (such as a given web page 302 depicted in FIG. 3) that is identifiable, in the communication network 240, using, for example, a respective Unique Resource Locator (URL) associated with the at least one page. One of examples of the given web resource 255 may include, without limitation, a web site, such as a commercial web site aimed at promoting certain goods, a social network (such as for example, Facebook.com™), an online video service (for example, Kinopoisk.ru™), and the like.

Thus, in some non-limiting embodiments of the present technology, the user 230, using the electronic device 210, may request access to the given web page 302, such as by submitting the associated URL to an address bar (not depicted in FIG. 2) of a browser application 215 running on the electronic device 210. In another example, the user 230 can be redirected to the given web page 302 from another web page including a respective reference to the given web page 302, on which the user 230 has clicked, as an example. Further, in response, the server 250 can be configured to grant access to the electronic device 210 to the given web page 302 of the given web resource 255 by transmitting a respective digital document representative thereof to the electronic device 210 for presentation to the user 230.

In the context of the present specification, the browser application 215 can be a software application run on an electronic device, such as the electronic device 210, and configured to provide access to resources of nodes of a given network, such as those of the communication network 240, in response to receiving respective network addresses thereof in the given network. In specific non-limiting example, the browser application 215 can be implemented as a Yadex.Browser™ browser application provided by Yandex LLC of Lev Tolstoy Street, No. 16, Moscow, 119021, Russia.

Further, the respective digital document representative of the given web page 302 may comprise an executable source code, such as that developed in HyperText Markup Language (HTML). However, in other non-limiting embodiments of the present technology, at least a portion of the executable source code can be developed in a different programming language—such as at least one a JavaScript programming language and a Cascading Style Sheets (CSS) programming language.

Thus, having received this digital document, the browser application 215 of the electronic device 210 can be caused to execute the executable source code associated with the given web page 302, thereby rendering, such as by a rendering engine of the browser application 215, a visual representation thereof for presentation to the user 230.

Figure 3:
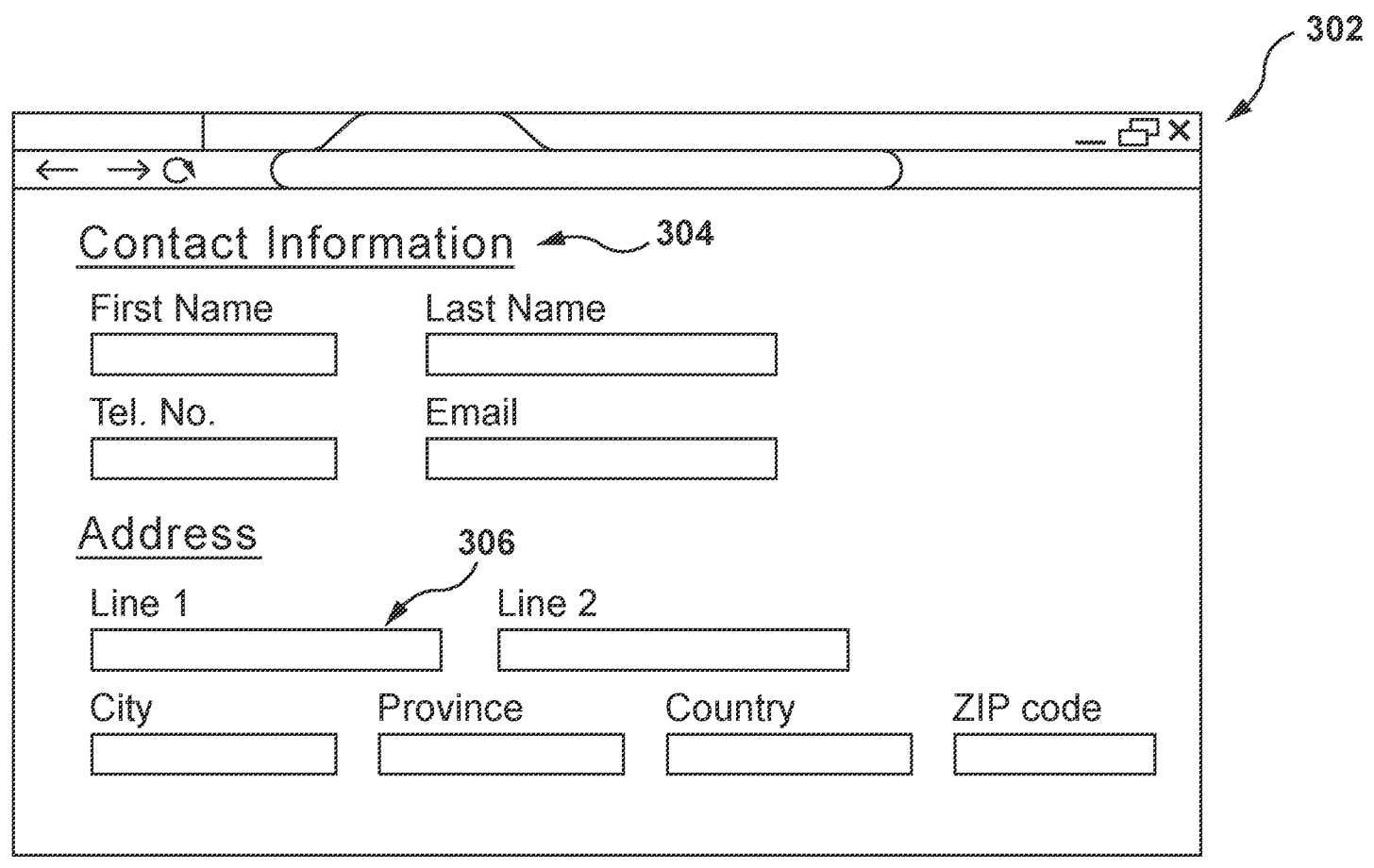

With reference to FIG. 3, there is depicted a graphical user interface of the browser application 215 providing the visual representation of the given web page 302, in accordance with certain non-limiting embodiments of the present technology.

As it can be appreciated from FIG. 3, according to certain non-limiting embodiments of the present technology, the given web page 302 can include a plurality of layout elements defining the visual representation thereof. For example, some of the plurality of layout elements can be static, that is, are not configured to respond to user interactions therewith. Such layout elements are referred herein as "non-user-activatable layout elements", such as a given non-user-activatable layout element 304 comprising a caption "Contact Information", which, as it can be appreciated, once rendered, by the rendering engine of the browser application 215, would not react to user interactions of the user 230 therewith.

Further, according to certain non-limiting embodiments of the present technology, the visual representation of the given web page 302 can further include layout elements with which the user 230 can interact. Such layout elements are referred to herein as "user-activatable layout elements" and can include layout elements configured for receiving user inputs, such as clicks, textual inputs of the user 230, and the like. For example, as illustrated in FIG. 3, a given user-activatable layout element 306 can include an input field for receiving textual information representative of an address to be provided by the user 230. Other examples of the user-activatable layout elements are not limited and, depending on a subject matter present in a respective web page, can include checkboxes, radio buttons, dropdown menus, and other interactive web elements whose visual appearance can be changed in response to the user inputs of the user 230.

Further, according to certain non-limiting embodiments of the present technology, the given user-activatable layout element 306 of the given web page 302 can be configured for outputting customized suggests in response to certain user interactions. As used herein, a customized suggest is a predicted automatic completion of a given user interaction with the given user-activatable layout element 306.

Figure 4:
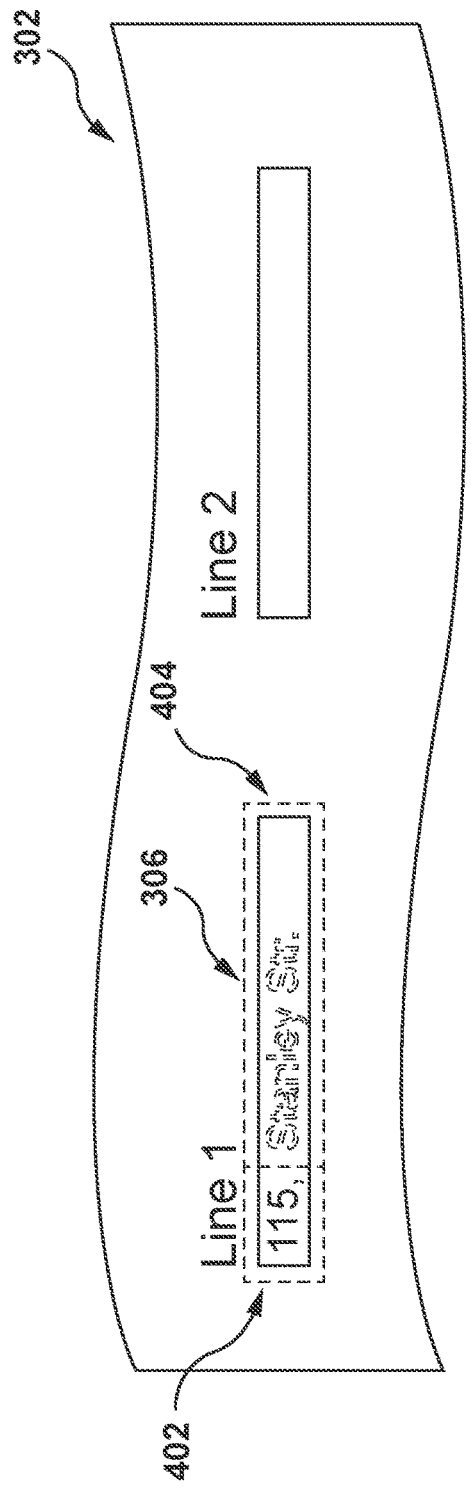
FIGS. 4 and 5 depict schematic diagrams of different approach for providing customized suggests in certain layout elements of the given web page depicted in FIG. 3, in accordance with certain non-limiting embodiments of the present technology.
Figure 5:
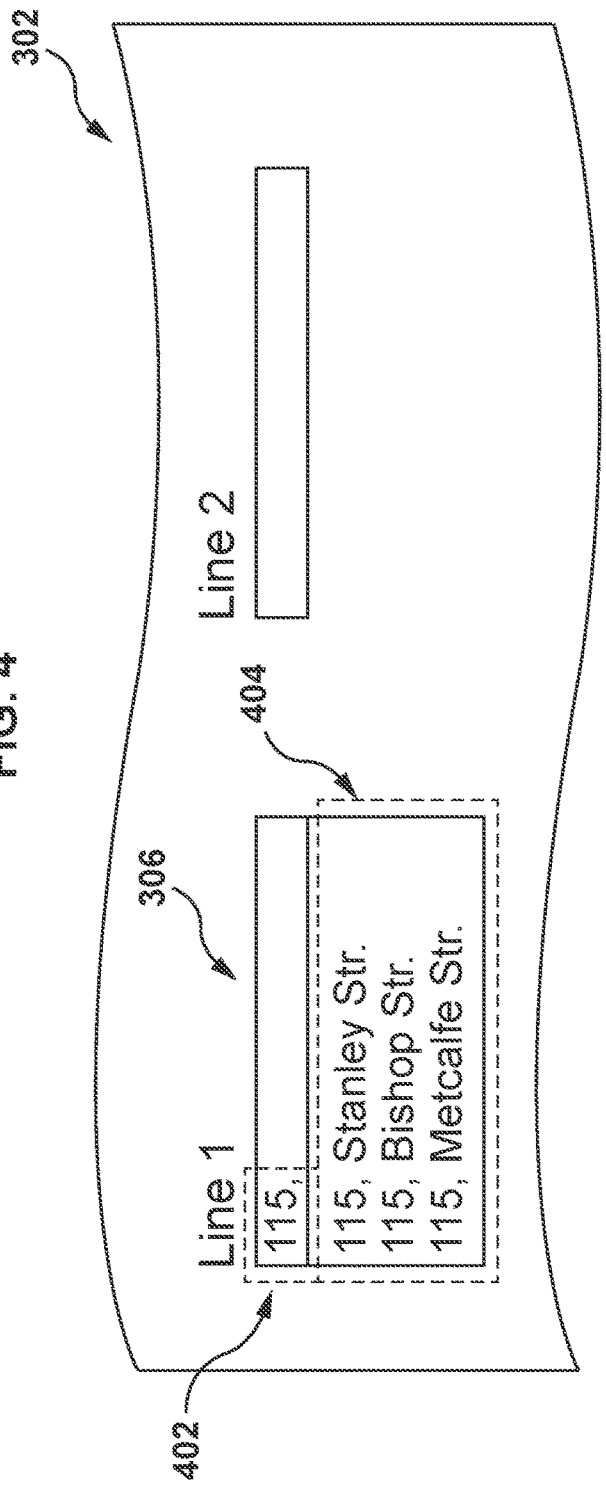

With reference to FIGS. 4 and 5, there are depicted schematic diagrams of an approach for providing respective customized suggests 404 for the given user-activatable layout element 306 in response to given user interactions 402 therewith, in accordance with certain non-limiting embodiments of the present technology. As it can be appreciated, the given user interactions 402 can be, for example, a partial input of the textual information representative of the address. However, the given user interactions 402 with the given user-activatable layout element 306 can also include a click—such as putting a cursor in the given user-activatable layout element 306, or a pointer (such as of a mouse) hover over the given user-activatable layout element 306, and the like.

Further, in response to the given user interactions 402, in one example, depicted in FIG. 4, the respective customized suggests 404 output in the given user-activatable layout element 306 can include an autocompletion of the partial input entered by the user 230. In response to being provided with the respective customized suggests 404, the user 230 can further either (i) accept the respective customized suggests 404, such as by providing a predetermined confirmation input (a click thereon, as an example); or (ii) reject the respective customized suggests 404, such as by continuing typing in the address.

In another example, the respective customized suggests 404 output in the given user-activatable layout element 306 can include a plurality of autocompletion options responsive to the given user interactions 402, organized, for example, in a dropdown menu, as depicted in FIG. 5, in accordance with certain non-limiting embodiments of the present technology. In this example, the user 230 can also either (i) select one of the provided autocompletion options of the respective customized suggests 404, such as by clicking thereon; or (ii) reject all of the respective customized suggests 404, such as by continuing typing in the address.

According to certain non-limiting embodiments of the present technology, the respective customized suggests 404 can be generated and further provided by the browser application 215. In such a case, the respective customized suggests 404 are referred to herein as "browser customized suggests". More specifically, the processor 110 of the electronic device 210 can be configured to cause the browser application 215 to: (1) store, such as in the solid-state drive 120 of the electronic device 210 (or in a cloud storage, for example), information indicative of user inputs that the user 230 has provided into respective user-activatable layout elements of various web pages; (ii) in response to receiving the given user interactions 402, identify a type of the given user-activatable layout element; and (iii) based on past user interactions with similar respective user-activatable layout elements, generate and provide the browser customized suggests for completing the given user interactions 402.

It is not limited how the browser application 215 can be configured to identify the type of the given user-activatable element 306 and may include, for example, parsing the executable source code of the given web page 302 to identify (1) portions of the executable source code of the given web page 302 corresponding to the given user-activatable layout element 306; (2) a subject matter of the given web page 302; (3) other layout elements, neighboring the given user-activatable layout element 306, such as that representative of a caption "Address"; and (4) dimensions and/or shape of the given user-activatable layout element 306.

However, in other non-limiting embodiments of the present technology, the respective customized suggests 404 can be generated and further provided by the given web page 302. In such a case, the respective customized suggests 404 are referred to herein as "web page customized suggests". By way of example, the server 250 hosting the given web resource 255 including the given web page 302 can be configured to (i) determine a current location of the user 230, such as by an IP address associated with the electronic device 210 or based on data from a GPS chip thereof; (ii) identify the type of the given user-activatable layout element 306, as described above; and (iii) in response to receiving data indicative of the given user interactions 402, generate the web page customized suggests completing the given user interactions 402 for output thereof in the given user-activatable layout element 306.

Figure 6:
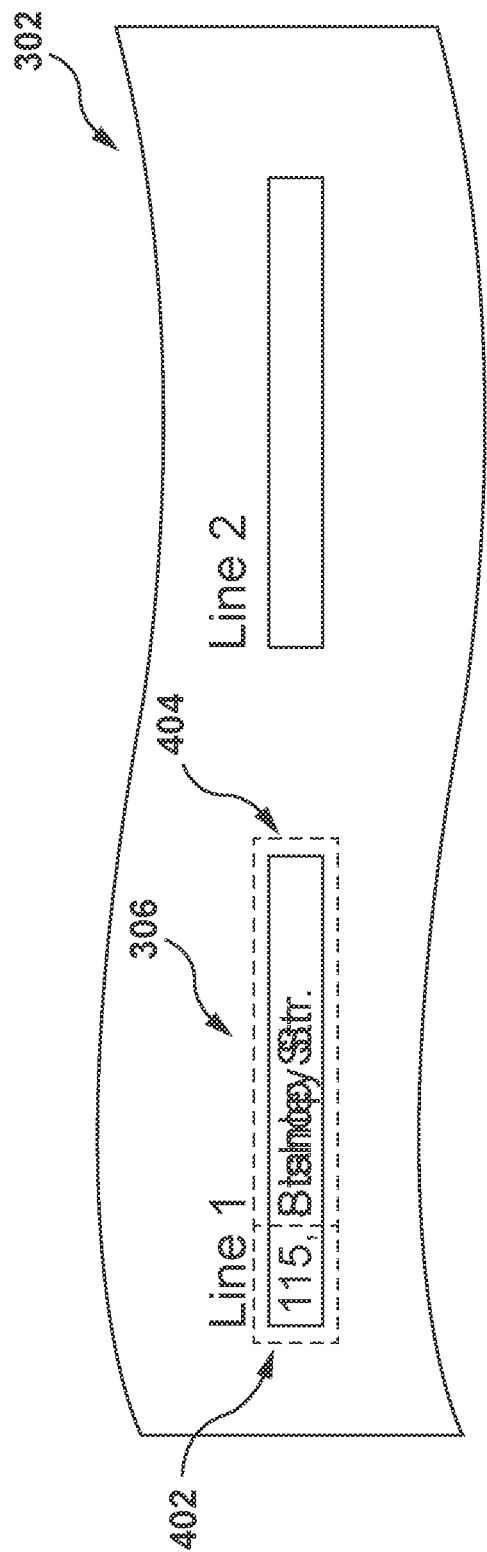
FIG. 6 depicts a schematic diagram of an overlap, in a respective layout element of the given web page of FIG. 3, between two types of customized suggests, independently generated by a server hosting the given web, and the browser application providing the visual representation thereof, in accordance with certain non-limiting embodiments of the present technology.

Thus, as it can be appreciated, each one of the browser application 215 and the given web page 302 can independently provide the browser customized suggests and the web page customized suggests, respectively, which may affect user experience of the user 230 interacting with the given web page 302. For example, as schematically depicted in FIG. 6, without having the benefit of the non-limiting embodiments of the present technology, both the browser customized suggests and the web page customized suggests can be simultaneously output in the given user-activatable layout element 306 and thus overlie each other therein, which can affect legibility thereof.

Thus, developers of the present technology have devised methods of prioritizing one of the browser customized suggests and the web page customized suggests over the other. More specifically, the methods and systems described herein are directed to (i) determining, by the processor 110 of the electronic device 210, before receiving the given user interactions 402, if the given web page 302 is configured, during the display thereof by the browsing application 215, for providing the web page customized suggests in the given user-activatable layout element 306, and (ii) in response to determining that the given web page is configured for providing the web page customized suggests in the given user-activatable layout element 306, disabling, by the processor 110, the browser application 215 to provide the browser customized suggests in the given user-activatable layout element 306. By so doing, the methods and systems described herein are directed to resolving the conflicts between customized suggests to be output in a single layout element.

How the processor 100 can be configured to determine if the given web page 302 is configured for providing the web page customized suggests, in accordance with certain non-limiting embodiments of the present technology, will be described below with reference to FIGS. 7 and 8.

Communication Network

In some non-limiting embodiments of the present technology, the communication network 240 is the Internet. In alternative non-limiting embodiments of the present technology, the communication network 240 can be implemented as any suitable local area network (LAN), wide area network (WAN), a private communication network, or the like. It should be expressly understood that implementations for the communication network are for illustration purposes only. How a respective communication link (not separately numbered) between each one of the electronic device 210, the server 250 and the communication network 240 is implemented will depend, inter alia, on how each one of electronic device 210, and the server 250 is implemented. Merely as an example and not as a limitation, in those embodiments of the present technology where the electronic device 210 is implemented as a wireless communication device such as the smartphone, the communication link can be implemented as a wireless communication link. Examples of wireless communication links include, but are not limited to, a 3G communication network link, a 4G communication network link, and the like. The communication network 240 may also use a wireless connection with the server 250 and the electronic device 210.

Detecting Web Page Suggests

According to certain non-limiting embodiments of the present technology, to determine if the given web page 302 is configured for providing the web page customized suggests, independently from the browser application 215, the processor 110 can be configured to generate a simulated user interaction with the given user-activatable layout element 306. Further, in response to a layout change of the given user-activatable layout element 306, the processor 110 can be configured to determine that the given web page 302 is configured to provide the web page customized suggests.

In the context of the present specification, the layout change of a layout element in response to a given interaction therewith, such as the simulated user interaction with the given user-activatable layout element 306, denotes a change, for example, of at least one of: dimensions, shape, and content of the given user-activatable layout element 306. Also, in another example, the layout change can further include rendering, by the rendering engine of the browser application, additional interactive layout elements, such as an additional output field associated with the given user-activatable layout element 306, additional actuators, such as a scroller and/or a button, for example, allowing choosing among different options, and the like.

It should be noted that, in some non-limiting embodiments of the present technology, the processor 110 can be configured to determine that the given web page 302 is configured for providing the web page customized suggests if, in response to the simulated user interaction with the given user-activatable layout element 306, the layout change occurs to any layout element present in the given web page 302.

In the context of the present specification, the simulated user interaction denotes an interaction, which, although mimicking a user interaction, is not caused by a human user, such as the user 230, and is generated automatically, by executing, for example, by the processor 110, respective software instructions. In some non-limiting embodiments of the present technology, the simulated user interaction can be a simulated user click on the given user-activatable layout element 306. In other non-limiting embodiments of the present technology, the simulated user interaction can be a simulated symbol input. In yet other non-limiting embodiments of the present technology, the simulated user interaction can include both the simulated click and the simulated symbol input following thereafter.

In a specific non-limiting example, the simulated user interaction with the given user-activatable layout element 306 can include the processor 110 configured to hit-test the given user-activatable layout element 306.

In some non-limiting embodiments of the present technology, the processor 110 can be configured to generate and apply the simulated user interaction to the given user-activatable layout element 306 prior to causing display of the given web 302. In other non-limiting embodiments of the present technology, the processor 110 can be configured to generate and apply the simulated user interaction to the given user-activatable layout element 306 after causing display of the given web page 302, such as within a predetermined time interval after loading and rendering the given web page 302 by the browser application 215—0.3 to 0.5 seconds, for example. In yet other non-limiting embodiments of the present technology, the processor 110 can be configured to generate and apply the simulated user interaction to the given user-activatable layout element 306 after the causing display of the given web page 302 from time to time, such as regularly, with a predetermined period, such as once in 5 or 10 seconds, as an example.

In yet other non-limiting embodiments of the present technology, the processor 110 can be configured to cause the simulated user interaction with the given user-activatable layout element 306 in response to a predetermined action from the user 230. In one example, such a predetermined user action can include refreshing the given web page 302.

In another example, the predetermined user action can include scrolling a predetermined portion of the given web page 302, such as 60%. Other user actions with respect to the given web page 302 triggering the processor 110 to cause the simulated user interactions with the given user-activatable layout element 306 are also envisioned without departing from the scope of the present technology.

According to certain non-limiting embodiments of the present technology, to determine if the given web page 302 is configured for providing the web page customized suggests in the given user-activatable layout element, the processor 110 can be configured to cause the simulated user interaction with certain points along a visual representation of the given user-activatable layout element 306. More specifically, the processor 110 can be configured to "scan" the visual representation of the given user-activatable layout element 306 in certain points thereof to determine if there is the layout change of the given user-activatable layout element 306, which is representative of the given web page 302 being configured for providing the web page customized suggests therein.

It should be noted that certain non-limiting embodiments of the present technology are based on a premise that the rendering engine of the browser application 215 can be configured to recognize that a response to the simulated user interaction has been generated by the given web page 302 and not by the browser application 215. More specifically, according to non-limiting embodiments of the present technology, the rendering engine can be implemented in such a way that it does not form part of a Graphical User Interface (GUI) of the browser application 215 and thus does not "see" changes that are caused by the browser application 215. Thus, any changes to the layout that are "seen" by the rendering engine are attributable to the given web page 302 and not to the browser application 215

Figure 7:
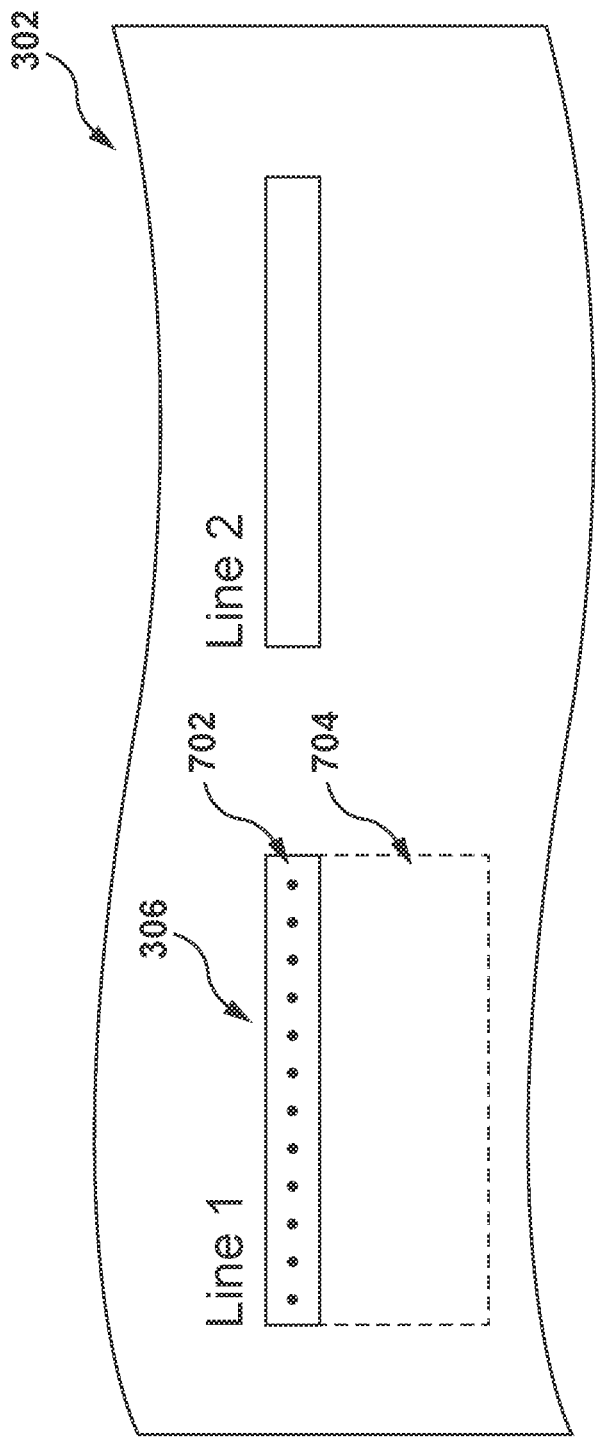
FIG. 7 depicts a schematic diagram of an approach to scanning the respective layout element of the given web page of FIG. 3 to determine, by the processor of the electronic device present in the networked computing environment of FIG. 2, of the given web page is configured for providing its customized suggests independently from the browser application, in accordance with certain non-limiting embodiments of the present technology.
Figure 8:
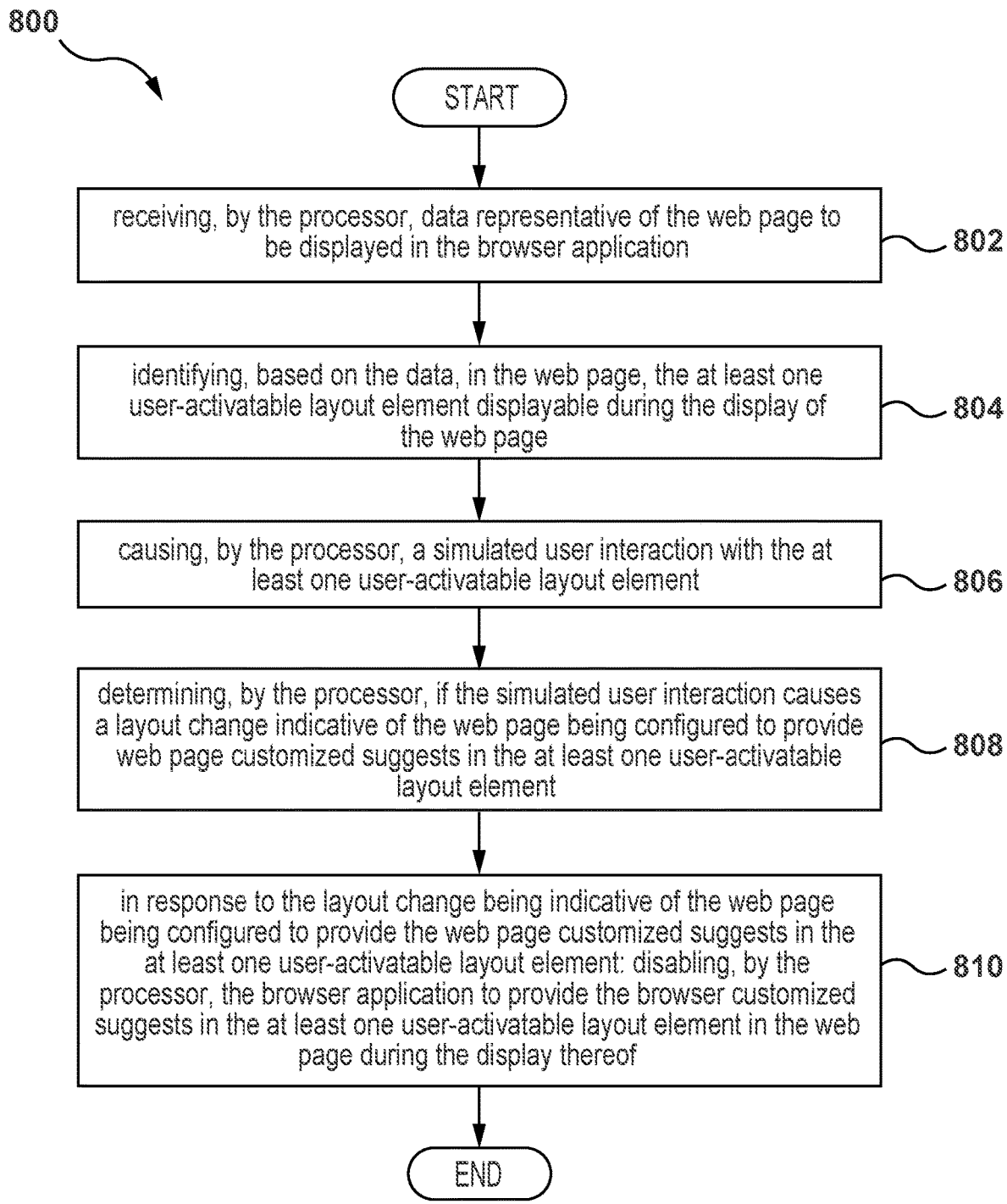
FIG. 8 depicts a flowchart diagram of a method for controlling, by the processor of the electronic device present in the networked computing environment of FIG. 2, display of the given web page of FIG. 3, in accordance with certain non-limiting embodiments of the present technology.

Thus, according to certain non-limiting embodiments of the present technology, the rendering engine can be configured to determine that the layout change (such as a respective layout change schematically depicted in FIG. 7) triggered by applying the simulated user interaction with the given user-activatable layout element 306 is caused by the given web page 302 and not by the browser application 215. Therefore, the processor 110 can be configured to determine that the respective layout change 704 is indicative of the web page customized suggests and not of the browser customized suggests.

For example, the processor 110 can be configured to cause the simulated user interaction with the given user-activatable layout element 306 according to a predetermined pattern associated therewith. With reference to FIG. 7, there is depicted a schematic diagram of a respective scanning pattern 702 applied to the visual representation of the given user-activatable layout element 306 for causing the simulated user interaction therewith, in accordance with certain non-limiting embodiments of the present technology.

As it can be appreciated, the respective scanning pattern 702 includes a plurality of points, each of which can include a respective set of coordinate values, such as Cartesian coordinates, in a coordinate system associated with the given web page 302. Thus, the processor 110 can be configured to: (i) identify, using the coordinate values, each one of the plurality of points within the given web page 302, and (ii) cause the simulated user interaction therewith to determine if there is any layout change, such as a respective layout change 704, in response.

In the illustrated embodiments, the respective layout change 704 is an additional layout element defining a space for a dropdown menu; however, it should be expressly understood that other layout changes associated with the given user-activatable element 306, such as a text output therein, are also envisioned. Also, it should be noted that a particular implementation of the layout change 704 generally depends on an implementation of the given user-activatable layout element 306. By way of example, in those embodiments of the present technology where the given user-activatable layout element 306 is a radio button or a checkbox, and the simulated user interaction therewith is thus a click thereon, the respective layout change 704 can include automatic checking other radio buttons or checkboxes (not depicted) present in the given web page 302, rendering input additional input fields thereon, and the like.

In some non-limiting embodiments of the present technology, the respective scanning pattern 702 can be pre-associated with the given user-activatable layout element 306 in a memory of the electronic device 210, such as in the solid-state drive 120; and, prior to causing the simulated user interaction, the processor 110 can be configured to: (i) parse the executable source code of the given web page 302; (ii) identify, in the executable source code, the given user-activatable layout element 306; and (iii) retrieve the respective scanning pattern 704 for application thereof to visual representation of the given user-activatable layout element 306.

However, in other non-limiting embodiments of the present technology, the processor 110 can be configured to determine the respective scanning pattern 702. More specifically, having identified the given user-activatable layout element 306, the processor 110 can be configured to determine parameters thereof, such as the dimensions and a geometry thereof, and based on these parameters, determine a shape of the respective scanning pattern 702 and a number of points to be scanned therein. By way of example, the processor 110 can be configured to determine the respective scanning pattern 702 as being the plurality of points defining a line segment extending along one of sides of the given user-activatable layout element 306, as illustrated in FIG. 7. However, in another example (not depicted), the processor 110 can be configured to determine the respective scanning pattern 702 as the plurality of points extending along a contour of the given user-activatable layout element 306. In yet other example (also not depicted), the processor 110 can be configured to determine the respective scanning pattern 702 as the plurality of points distributed within an area of the visual representation of the given user-activatable layout element 306, such as uniformly, as an example. However, the distribution of the plurality of points within the area of the visual representation of the given user-activatable layout element 306 is not limited and can be representative of a probability of a pointer hover over the given user-activatable layout element 306, such as that corresponding to the normal distribution, as an example.

Further, as it can be appreciated, a density value of the plurality of points defining the respective scanning pattern 702 is indicative of a scanning frequency of the given user-activatable element 306 by the processor 110. Thus, the density value of the plurality of points can be pre-determined based on a trade-off between an accuracy of scanning the given user-activatable element 306 and computational resources consumption of the processor 110.

It should be expressly understood that the respective scanning pattern 702 is illustrated in FIG. 7 as overlying the visual representation of the given user-activatable element 306 solely for the purposes of illustration; and, according to certain non-limiting embodiments of the present technology, the respective scanning pattern 702 may not be visible during the actual display of the given web page 302.

As mentioned above, in some non-limiting embodiments of the present technology, the processor 110 can be configured to scan the given user-activatable layout element 306 regularly, with the predetermined period. More specifically, in some non-limiting embodiments of the present technology, the processor 110 can be configured to scan each one of the plurality of points defining the respective scanning pattern 702 with a same period, that is, the predetermined period. However, in other non-limiting embodiments of the present technology, the processor 110 can be configured to scan each one of the plurality of points differently. For example, the processor 110 can be configured to increase a scanning period for those points that do not cause the respective layout change 704 in response to the simulated user interaction therewith. In specific non-limiting example, the processor 110 can be configured to increase the scanning period exponentially. However, it should be noted that other functions, such as a power function or a logarithmic function, as well as various parameters thereof, can also be used for determining the increase of the scanning period for the points. By doing so, the computational resources of the processor 110 can be saved on scanning the points of the respective scanning pattern 702 irresponsive to the simulated user interaction therewith. It should further be noted that the processor 110 can be configured to reset the scanning period of each one of the plurality of points in response to a predetermined user action, such as refreshing the given web page 302, as an example.

Thus, according to certain non-limiting embodiments of the present technology, the processor 110 can be configured to cause the simulated user interaction with each one of the plurality of points of the respective scanning pattern 702 to determine if there is the respective layout change 704 in response. Further, by determining that the simulated user interaction with any of the plurality of points causes the respective layout change 704, the processor 110 can be configured to determine that the given web page 302 is configured for providing the web page customized suggests. In this regard, according to the non-limiting embodiments of the present technology, the processor 110 can be configured to disable the browser application 215 to provide the browser customized suggests in the given user-activatable layout element 306. By doing so, the processor 110 is configured to prevent an overlap between the browser customized suggests and the web page customized suggests, which is believed to improve the user experience from interacting with the browser application 215 and the given web page 302.

It should be expressly understood that prioritizing the web customized suggests over the browser customized suggests is described above only for the purposes of explanation of the non-limiting embodiments of the present technology. In other non-limiting embodiments of the present technology, in response to determining that the simulated user interaction with any one of the plurality of points defining the respective scanning pattern 702 causes the respective layout changes 704, the processor 110 can be configured to disable the server 250 to provide the web page customized suggests for output thereof in the given user-activatable layout element 306.

Method

Given the architecture and the examples provided hereinabove, it is possible to execute a method for controlling the display of a web page, such as the given web page 302, as described above. With reference now to FIG. 8, there is depicted a flowchart of a method 800, according to the non-limiting embodiments of the present technology. The method 800 may be executed by the processor 110 of the electronic device 210. As noted above, the electronic device 210 can be configured to execute the browser application 215, via which the processor 110 can be configured to execute the method 800.

Step 802: Receiving, by the Processor, Data Representative of the Web Page to be Displayed in the Browser Application The method 800 commences at step 802 where the processor 110 is configured to receive data representative of the given web page 302 for display thereof in the browser application 215. As mentioned above with reference to FIGS. 2 and 3, such data can include a digital document containing an executable source code of the given web page 302, such as that developed in HyperText Markup Language (HTML). However, in other non-limiting embodiments of the present technology, at least a portion of the executable source code can be developed in a different programming language—such as at least one a JavaScript programming language and a Cascading Style Sheets (CSS) programming language.

Thus, by executing the executable source code of the given web page 302, the processor 110 can be configured to render, using the rendering engine o the browser application 215, for example, the visual representation of the given web page 302 in the browser application 215, such as that schematically illustrated in FIG. 3.

The method 800 hence advances to step 804.

Step 804: Identifying, Based on the Data, in the Web Page, the at Least One User-Activatable Layout Element Displayable During the Display of the Web Page At step 804, the processor 110 can be configured to identify, such as by parsing the executable source code of the given web page 302, a given user-activatable layout element present therein, such as the given user-activatable layout element 306 mentioned above.

The method 800 thus advances to step 806.

Step 806: Causing, by the Processor, a Simulated User Interaction with the at Least One User-Activatable Layout Element At step 806, in some non-limiting embodiments of the present technology, the processor 110 can be configured to cause the simulated user interaction with the given user-activatable layout element 306 to determine if there is any layout change thereof in response, such as the respective layout change 704 described above with reference to FIG. 7.

As mentioned above, in some non-limiting embodiments of the present technology, the simulated user interaction can be a simulated user click on the given user-activatable layout element 306. In other non-limiting embodiments of the present technology, the simulated user interaction can be a simulated symbol input. In yet other non-limiting embodiments of the present technology, the simulated user interaction can include both the simulated click and the simulated symbol input following thereafter.

In a specific non-limiting example, the simulated user interaction with the given user-activatable layout element 306 can include the processor 110 configured to hit-test the given user-activatable layout element 306.

In some non-limiting embodiments of the present technology, the processor 110 can be configured to generate and apply the simulated user interaction to the given user-activatable layout element 306 prior to causing display of the given web 302. In other non-limiting embodiments of the present technology, the processor 110 can be configured to generate and apply the simulated user interaction to the given user-activatable layout element 306 after causing display of the given web page 302, such as within a predetermined time interval after loading and rendering the given web page 302 by the browser application 215—0.3 to 0.5 seconds, for example. In yet other non-limiting embodiments of the present technology, the processor 110 can be configured to generate and apply the simulated user interaction to the given user-activatable layout element 306 after the causing display of the given web page 302 from time to time, such as regularly, with a predetermined period, such as once in 5 or 10 seconds, as an example.

In yet other non-limiting embodiments of the present technology, the processor 110 can be configured to cause the simulated user interaction with the given user-activatable layout element 306 in response to a predetermined action from the user 230. In one example, such a predetermined user action can include refreshing the given web page 302. In another example, the predetermined user action can include scrolling a predetermined portion of the given web page 302, such as 60%. Other user actions with respect to the given web page 302 triggering the processor 110 to cause the simulated user interactions with the given user-activatable layout element 306 are also envisioned without departing from the scope of the present technology.

Further, in some non-limiting embodiments of the present technology, prior to causing the simulated user interaction with the given user-activatable layout element 306, the processor 110 can be configured to retrieve, or otherwise determine, a respective pattern associated with the given user-activatable layout 306, such the respective scanning pattern 702 depicted in FIG. 7. Further, the processor 110 can be configured to apply the respective scanning pattern 702 to the visual representation of the given user-activatable layout element 306 to further cause the simulated user interaction in accordance with the respective scanning pattern 702.

The respective scanning pattern 702 includes a plurality of points, each of which can include a respective set of coordinate values, such as Cartesian coordinates, in a coordinate system associated with the given web page 302. Thus, the processor 110 can be configured to: (i) identify, using the coordinate values, each one of the plurality of points within the given web page 302, and (ii) cause the simulated user interaction therewith to determine if there is any layout change, in response.

In some non-limiting embodiments of the present technology, the processor 110 can be configured to scan the given user-activatable layout element 306 regularly, with the predetermined period. More specifically, in some non-limiting embodiments of the present technology, the processor 110 can be configured to scan each one of the plurality of points defining the respective scanning pattern 702 with a same period, that is, the predetermined period. However, in other non-limiting embodiments of the present technology, the processor 110 can be configured to scan each one of the plurality of points differently. For example, the processor 110 can be configured to increase a scanning period for those points that do not cause the respective layout change 704 in response to the simulated user interaction therewith. In specific non-limiting example, the processor 110 can be configured to increase the scanning period exponentially. However, it should be noted that other functions, such as a power function or a logarithmic function, as well as various parameters thereof, can also be used for determining the increase of the scanning period for the points. By doing so, the computational resources of the processor 110 can be saved on scanning the points of the respective scanning pattern 702 irresponsive to the simulated user interaction therewith. It should further be noted that the processor 110 can be configured to reset the scanning period of each one of the plurality of points in response to a predetermined user action, such as refreshing the given web page 302, as an example.

The method 800 thus proceeds to step 808.

Step 808: Determining, by the Processor, if the Simulated User Interaction Causes a Layout Change Indicative of the Web Page being Configured to Provide Web Page Customized Suggests in the at Least One User-Activatable Layout Element At step 808, the processor 110 can be configured to determine, if the simulated user interaction with any one of the plurality of points defining the respective scanning pattern 702 applied to the given user-activatable layout element 306 causes the respective layout change 704.

As mentioned above with reference to FIG. 7, the respective layout change 704 can be an additional layout element defining a space for a dropdown menu, as an example. However, it should be expressly understood that other layout changes associated with the given user-activatable element 306, such as a text output therein, are also envisioned. Also, it should be noted that a particular implementation of the layout change 704 generally depends on an implementation of the given user-activatable layout element 306. By way of example, in those embodiments of the present technology where the given user-activatable layout element 306 is a radio button or a checkbox, and the simulated user interaction therewith is thus a click thereon, the respective layout change 704 can include automatic checking other radio buttons or checkboxes (not depicted) present in the given web page 302, rendering input additional input fields thereon, and the like.

The method 800 hence advances to step 810.

Step: 810: In Response to the Layout Change being Indicative of the Web Page being Configured to Provide the Web Page Customized Suggests in the at Least One User-Activatable Layout Element: Disabling, by the Processor, the Browser Application to Provide the Browser Customized Suggests in the at Least One User-Activatable Layout Element in the Web Page During the Display Thereof At step 810, according to certain non-limiting embodiments of the present technology, by determining that the simulated user interaction with any of the plurality of points causes the respective layout change 704, the processor 110 can be configured to determine that the given web page 302 is configured for providing the web page customized suggests. In this regard, according to the non-limiting embodiments of the present technology, the processor 110 can be configured to disable the browser application 215 to provide the browser customized suggests in the given user-activatable layout element 306. By doing so, the processor 110 is configured to prevent an overlap between the browser customized suggests and the web page customized suggests, which is believed to improve the user experience from interacting with the browser application 215 and the given web page 302.

In other non-limiting embodiments of the present technology, in response to determining that the simulated user interaction with any one of the plurality of points defining the respective scanning pattern 702 causes the respective layout changes 704, the processor 110 can be configured to disable the server 250 to provide the web page customized suggests for output thereof in the given user-activatable layout element 306.

The method 800 thus terminates.

Thus, certain non-limiting embodiments of the method 800 are directed to prioritizing a given one of the browser customized suggests and the web page customized suggests over the other, which is believed to improve user experience from interacting with web pages.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method of controlling display of a web page in a browser application, the method being executable by at least one hardware processor of an electronic device running the browser application, the browser application configured to provide browser customized suggests in at least one user-activatable layout element of the web page, the method comprising:
receiving, by the at least one hardware processor, data representative of the web page to be displayed in the browser application;
identifying, based on the data, in the web page, the at least one user-activatable layout element displayable during the display of the web page;
causing, by the at least one hardware processor, a simulated user interaction with the at least one user-activatable layout element;
determining, by the at least one hardware processor, if the simulated user interaction causes a layout change indicative of the web page being configured to provide web page customized suggests in the at least one user-activatable layout element,
the web page customized suggests having been generated by the web page independent of the browser application;
in response to the layout change being indicative of the web page being configured to provide the web page customized suggests in the at least one user-activatable layout element:
disabling, by the at least one hardware processor, the browser application to provide the browser customized suggests in the at least one user-activatable layout element, such that only the web page customized suggests are provided in the web page during the display thereof.

2. The method of claim 1, wherein the data representative of the web page comprises at least one of a JavaScript source code and a Cascading Style Sheets (CSS) source code thereof.

3. The method of claim 1, wherein prior to the causing the simulated user-interaction, the method further comprises:
retrieving, by the at least one hardware processor, a respective scanning pattern for the at least one user-activatable layout element,
the respective scanning pattern comprising a plurality of points representative of a visual appearance of the at least one user-activatable layout element within the web page;
applying, by the at least one hardware processor, the respective scanning pattern to an area of the at least one user-activatable layout element, and wherein:
the causing the simulated user interaction with the at least one user-activatable layout element comprises causing the simulated user interaction with each one of the plurality of points.

4. The method of claim 3, wherein the causing the simulated user interaction with a given one of the plurality of points is executed with a predetermined time interval.

5. The method of claim 4, in response to the simulated user interaction with the given one of the plurality of points not causing the web page to provide the web page customized suggests in the at least one user-activatable layout element, further comprising increasing, by the at least one hardware processor, the predetermined time interval.

6. The method of claim 5, wherein the increasing the predetermined time interval at each iteration of causing the simulated user interaction with the given one of the plurality of points is exponential.

7. The method of claim 1, wherein the simulated user interaction comprises hit-testing of the at least one user-activatable layout element.

8. The method of claim 1, wherein the causing the simulated user interaction is executed prior to the display of the web page.

9. The method of claim 1, wherein the causing the simulated user interaction is executed during the display of the web page.

10. The method of claim 1, wherein the causing the simulated user interaction is executed in response to refreshing the web page.

11. The method of claim 1, wherein the layout change being indicative of the web page being configured to provide the web customized suggests is determined by a rendering engine of the browser application, such that:
in response to the simulated user interaction with the at least one user-activatable layout element causing the layout change thereof, the rendering engine is configured to determine that the layout change is indicative of the web page being configured to provide the web page customized suggests.

12. A method of controlling display of a web page in a browser application, the method being executable by at least one hardware processor of an electronic device running the browser application, the browser application configured to provide browser customized suggests in at least one user-activatable layout element of the web page, the method comprising:
receiving, by the at least one hardware processor, data representative of the web page to be displayed in the browser application;
identifying, based on the data, in the web page, the at least one user-activatable layout element displayable during the display of the web page;
causing, by the at least one hardware processor, a simulated user interaction with the at least one user-activatable layout element;
determining, by the at least one hardware processor, if the simulated user interaction causes a layout change indicative of the web page being configured to provide web page customized suggests in the at least one user-activatable layout element, the web page customized suggests having been generated by the web page independent of the browser application;
in response to the layout change being indicative of the web page being configured to provide the web page customized suggests in the at least one user-activatable layout element:
disabling, by the at least one hardware processor, a pre-determined one of:
the browser application to provide the browser customized suggests in the at least one user-activatable layout element in the web page during the display thereof; and
the web page to provide the web page customized suggests in the at least one user-activatable layout element in the web page during the display thereof.

13. The method of claim 12, wherein the data representative of the web page comprises at least one of a JavaScript source code and a Cascading Style Sheets (CSS) source code thereof.

14. The method of claim 12, wherein prior to the causing the simulated user-interaction, the method further comprises:
retrieving, by the at least one hardware processor, a respective scanning pattern for the at least one user-activatable layout element,
the respective scanning pattern comprising a plurality of points representative of a visual appearance of the at least one user-activatable layout element within the web page;
applying, by the at least one hardware processor, the respective scanning pattern to an area of the at least one user-activatable layout element, and wherein:
the causing the simulated user interaction with the at least one user-activatable layout element comprises causing the simulated user interaction with each one of the plurality of points.

15. The method of claim 14, wherein the causing the simulated user interaction with a given one of the plurality of points is executed with a predetermined time interval.

16. The method of claim 15, in response to the simulated user interaction with the given one of the plurality of points not causing the web page to provide the web page customized suggests in the at least one user-activatable layout element, further comprising increasing, by the at least one hardware processor, the predetermined time interval.

17. The method of claim 12, wherein the simulated user interaction comprises hit-testing of the at least one user-activatable layout element.

18. A method of controlling display of a web page in a browser application, the method being executable by at least one hardware processor of an electronic device running the browser application, the browser application being configured to provide browser customized suggests in at least one user-activatable layout element of the web page, the method comprising:
receiving, by the at least one hardware processor, data representative of the web page to be displayed in the browser application;
identifying, based on the data, in the web page, the at least one user-activatable layout element displayable during the display of the web page;
causing, by the at least one hardware processor, a simulated user interaction with the at least one user-activatable layout element;
determining, by the at least one hardware processor, if the simulated user interaction causes a layout change to the at least one user-activatable layout element;
in response to the simulated user interaction causing the layout change to the at least one user-activatable layout element:
disabling, by the at least one hardware processor, browser modifications, generated by the web browser application, to contents of the at least one user-activatable layout element in the web page during the display thereof.

19. The method of claim 18, wherein the layout change to the at least one user-activatable layout element is indicative of the web page being configured for providing, in the at least one user-activatable layout elements, web page customized suggests to a user browsing the web page,
the web page customized suggests having been generated by a web server hosting the web page.

20. The method of claim 18, wherein the browser modifications to the contents of the at least one user-activatable element comprises providing, by the at least one hardware processor, providing, by the browser application, browser customized suggests in the at least one user-activatable layout element,
the browser customized suggests having been generated by the browser application.

* * * * *